United States Patent
Vepa et al.

(10) Patent No.: US 6,512,774 B1
(45) Date of Patent: Jan. 28, 2003

(54) FAIL OVER WITH MULTIPLE NETWORK INTERFACE CARDS

(75) Inventors: RamKrishna Vepa, Danville, CA (US); Roman G. Baker, San Jose, CA (US); Sameer Nanda, Sunnyvale, CA (US); Thomas A. Maufer, Santa Clara, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/272,085

(22) Filed: Mar. 18, 1999

(51) Int. Cl.[7] ............................................. G06F 13/00
(52) U.S. Cl. ...................... 370/401; 370/242; 370/244; 709/224
(58) Field of Search .................................... 370/216, 217, 370/218, 219, 230, 235, 242, 243, 246, 225, 401, 465, 466, 446; 709/220, 224, 238, 245

(56) References Cited

U.S. PATENT DOCUMENTS

| | | | | |
|---|---|---|---|---|
| 5,864,535 A | * | 1/1999 | Basilico ...................... | 370/231 |
| 5,918,021 A | * | 6/1999 | Aditya ........................ | 709/235 |
| 6,049,528 A | * | 4/2000 | Hendel et al. ............... | 370/235 |
| 6,052,733 A | * | 4/2000 | Mahalingam et al. ........ | 709/235 |
| 6,151,297 A | * | 11/2000 | Congdon et al. ............. | 370/216 |
| 6,229,538 B1 | * | 5/2001 | McIntyre et al. ............ | 709/224 |

OTHER PUBLICATIONS

Sarparanta, Fault Tolerence—Requirements and Solutions, Helsinki University of Technology, pp. 1–10, May 3rd, 1998.*

* cited by examiner

Primary Examiner—Wellington Chin
Assistant Examiner—Frank Duong
(74) Attorney, Agent, or Firm—Wagner, Murabito & Hao LLP

(57) ABSTRACT

A method and system for detecting a non-functioning network interface card (NIC) in a server computer system adapted to have a plurality of network interface cards coupled thereto and communicatively coupled to client computer systems in a network. A directed packet is sent from a first NIC to a second NIC, and a direct packet is also sent from the second NIC to the first NIC. The server computer system monitors the NICs to determine whether the directed packet from the first NIC is received by the second NIC. The server computer system also monitors the first NIC to determine whether the directed packet from the second NIC is received by the first NIC. The server computer system determines whether the first NIC is functioning using the results from the monitoring. When the first NIC is determined to be non-functioning, the functions of the first NIC are automatically switched from the first NIC to one of the plurality of NICs. A broadcast packet is sent from the server computer system to the client computer systems. The broadcast packet contains a media access control (MAC) address for the NIC that replaces the first NIC, and each client computer system replaces the MAC address for the first NIC with the MAC address for the second NIC in its memory cache.

24 Claims, 12 Drawing Sheets

210

| NETWORK ADDRESS | MAC ADDRESS |
|---|---|
| SERVER NETWORK ADDRESS ... ... | MAC1 ADDRESS ... ... |

| DESTINATION ADDRESS 411 | SOURCE ADDRESS | TYPE | TARGET NETWORK ADDRESS | TARGET MAC | SOURCE NETWORK ADDRESS 416 | SOURCE MAC 417 |
|---|---|---|---|---|---|---|

FIG. 4

FAIL OVER WITH MULTIPLE NETWORK INTERFACE CARDS

TECHNICAL FIELD

The present invention relates to the field of computer system networks. In particular, the present invention pertains to a software-based module for augmenting a server computer system to perform network interface card fault tolerance and fail over.

BACKGROUND ART

Computer systems linked to each other in a network are commonly used in businesses and other organizations. Computer system networks ("networks") provide a number of benefits for the user, such as increased productivity, flexibility, and convenience as well as resource sharing and allocation.

Networks are configured in different ways depending on implementation-specific details such as the hardware used and the physical location of the equipment, and also depending on the particular objectives of the network. In general, networks include one or more server computer systems, each communicatively coupled to numerous client computer systems.

In contemporary networks, server computer systems are typically coupled to the network using more than one network interface card (NIC). Multiple NICs increase the total available bandwidth capacity for transmitting and sending data packets. Multiple NICs also provide resiliency and redundancy if one of the NICs fails. In the case of a failure of a NIC, one of the other NICs is used to handle the traffic previously handled by the failed NIC, thereby increasing overall system reliability. Therefore, the client computer systems in communication with the server computer system through a particular NIC are not cut off from the server should that NIC fail. Accordingly, it is necessary to be able to detect when a NIC fails and, when a failed NIC is detected, to switch to a functioning NIC (this is referred to as fault tolerance and fail over support) as quickly as possible in order to minimize the time until a communication link is re-established between the server computer system and the client computer systems.

Prior Art FIG. 1 is an illustration of exemplary network 50 including two virtual local area networks (VLANs). In network 50, client computer system 140 (e.g., a workstation) is in one VLAN, and client computer systems 141, 142 and 143 are in a second VLAN. Both VLANs are serviced by server computer system 160. A data packet sent by server computer system 160 contains address information that is used to identify the particular client computer system(s) to which the data packet is to be sent. In addition, the data packet is tagged with a VLAN identifier that identifies the destination VLAN. The methods for addressing a data packet in a network comprising multiple VLANs are well known in the art; one method is defined by the IEEE 802.1Q standard.

Switches 150 and 151 are able to read the VLAN identifier and the other address information contained in the data packet and direct the data packet accordingly. Thus, switch 150 reads the VLAN identifier and will direct the data packet to client computer system 140 if appropriate. Otherwise, the data packet proceeds to switch 151, which directs the data packet to the proper client computer system (e.g., client computer systems 141, 142 or 143) depending on the address information contained in the data packet.

One prior art technique for fault tolerance and fail over support utilizes a switch-dependent protocol implemented using server computer system 160 and switches 150 and 151. This prior art technique also requires NICs that are specifically designed for compatibility with switches 150 and 151 and the protocol being used. This prior art technique is problematic because it requires the use of a specific type of hardware (e.g., a specific type of NIC compatible with a specific type of switch). Thus, this prior art technique is not suitable for different types of hardware (e.g., NICs and switches). In particular, the prior art is not suitable for legacy hardware already present in a network.

Another drawback to this type of prior art technique is that the switch must be designed with the capability to implement the fault tolerance and fail over schemes. Thus, the complexity and the cost of the switch are substantially increased. Even so, the capabilities of the switch are relatively limited, and so the schemes for providing fault tolerance and fail over support are also limited. In addition, the cost of implementing this type of prior art technique is increased by the need to replace or upgrade legacy devices.

Prior art techniques for fault tolerance and fail over support are also not capable of detecting a partial failure of a NIC; that is, for example, they are not capable of detecting a NIC failure if the NIC is not able to properly transmit but continues to receive. These prior art techniques rely on the NIC to notify the server computer system protocols that the NIC is not functioning. However, consider the case in which a particular NIC is receiving and transmitting, but the outgoing data packets are not be received at their destination because of a failure that solely affects that NIC, such as, for example, a loose cable. In this case, the NIC is not aware that data packets it is transmitting are not reaching their destination. Because the NIC continues to receive properly, the NIC believes it is properly performing both of its send and receive functions. The NIC therefore does not notify the server computer system protocols that it is not functioning.

Thus, a disadvantage to the prior art is that some NIC failures are not detected, in particular partial failures, and so the overall reliability and performance of the server computer system and the network are reduced. This disadvantage is compounded because those who are responsible for maintaining the network will also not be aware of the failure and so cannot implement a fix; thus, the server computer system and network can continue to operate indefinitely with reduced reliability and performance. Furthermore, if the failure is detected, it may be necessary to test all of the NICs in order to isolate the failed NIC.

Accordingly, a need exists for a system and method that implement fault tolerance and fail over support wherein the system and method are not limited by the capabilities of a switch. A need also exists for a system and method that satisfy the above need, are switch-independent, and can be used with legacy hardware (e.g., switches and NICs). In addition, a need exists for a system and method that satisfy the above needs, can detect partial NIC failures (such as the inability of the NIC to either send or receive), and can identify which NIC has failed. Furthermore, a need exists for a system and method that satisfy the above needs and quickly accomplishes fail over to a functioning NIC in order to minimize the time during which the communication link between the server computer system and client computer systems is not available.

DISCLOSURE OF THE INVENTION

The present invention provides a system and method that implement fault tolerance and fail over support wherein the system and method are not limited by the capabilities of a switch. The present invention also provides a system and method that satisfy the above need, are switch-independent, and can be used with legacy hardware (e.g., switches and NICs). Furthermore, the present invention provides a system and method that satisfy the above needs, can detect partial NIC failures (such as the inability of the NIC to either send or receive), and can identify which NIC has failed. In addition, the present invention provides a system and method that satisfy the above needs and quickly accomplishes fail over to a functioning NIC in order to minimize the time during which the communication link between the server computer system and client computer systems is not available.

Specifically, in one embodiment, the present invention pertains to a method for detecting a non-functioning network interface card (NIC) in a server computer system adapted to have a plurality of network interface cards coupled thereto and communicatively coupled to client computer systems in a network. A directed packet is sent from a first NIC to a second NIC, and a direct packet is also sent from the second NIC to the first NIC. The server computer system uses a fault tolerance and fail over support scheme to monitor the NICs to determine whether the directed packet from the first NIC is received by the second NIC. The server computer system also monitors the first NIC to determine whether the directed packet from the second NIC is received by the first NIC. The server computer system determines whether the first NIC is functioning using the results from the monitoring.

In one embodiment, the first NIC sends a directed packet to a first plurality of NICs and a second plurality of NICs each send a directed packet to the first NIC. The server computer system monitors the first plurality of NICs to determine whether they receive the first directed packet, and the server computer system also monitors the first NIC to determine whether it receives each directed packet sent from the second plurality of NICs.

In one embodiment, when the first NIC is determined to be non-functioning, the functions of the first NIC are automatically switched from the first NIC to one of the plurality of NICs. A broadcast packet is sent from the server computer system to the client computer systems. The broadcast packet contains a media access control (MAC) address for the NIC that replaces the first NIC, and each client computer system replaces the MAC address for the first NIC with the MAC address for the second NIC in its memory cache.

In one embodiment, an indication is provided to the server computer system when the directed packet from the first NIC is not received by the second NIC or when the directed packet sent by the second NIC is not received by the first NIC. In this embodiment, the indication is a cable disconnect message or a link lost status message.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 illustrates the data structure of a memory cache of the client computer system of FIG. 2B in accordance with one embodiment of the present invention.

FIG. 4 illustrates the content of a broadcast data packet used in accordance with one embodiment of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "monitoring" or "determining" or "substituting" or "replacing" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
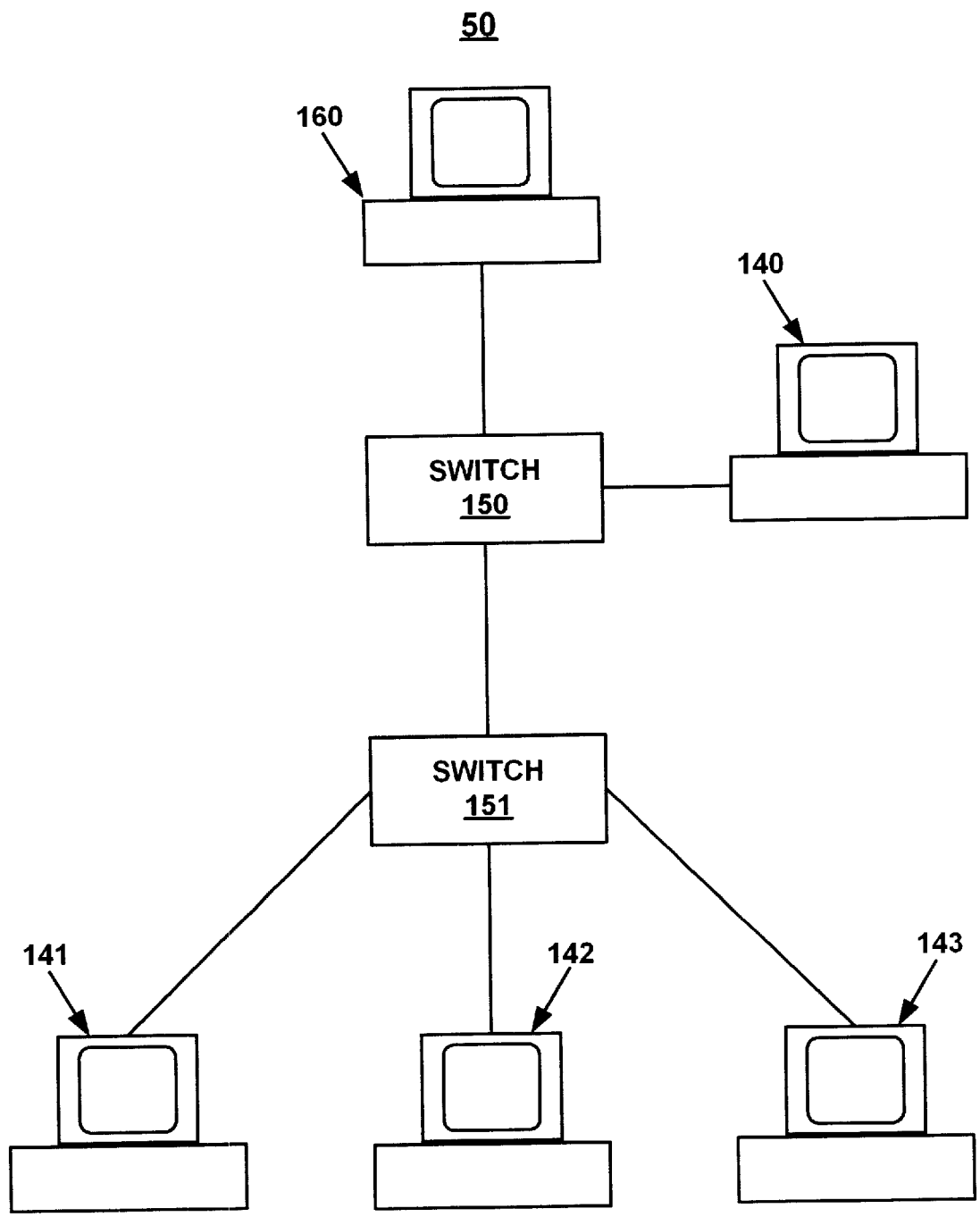
FIG. 1 is a block diagram of an exemplary computer system network of the prior art.
Figure 2A:
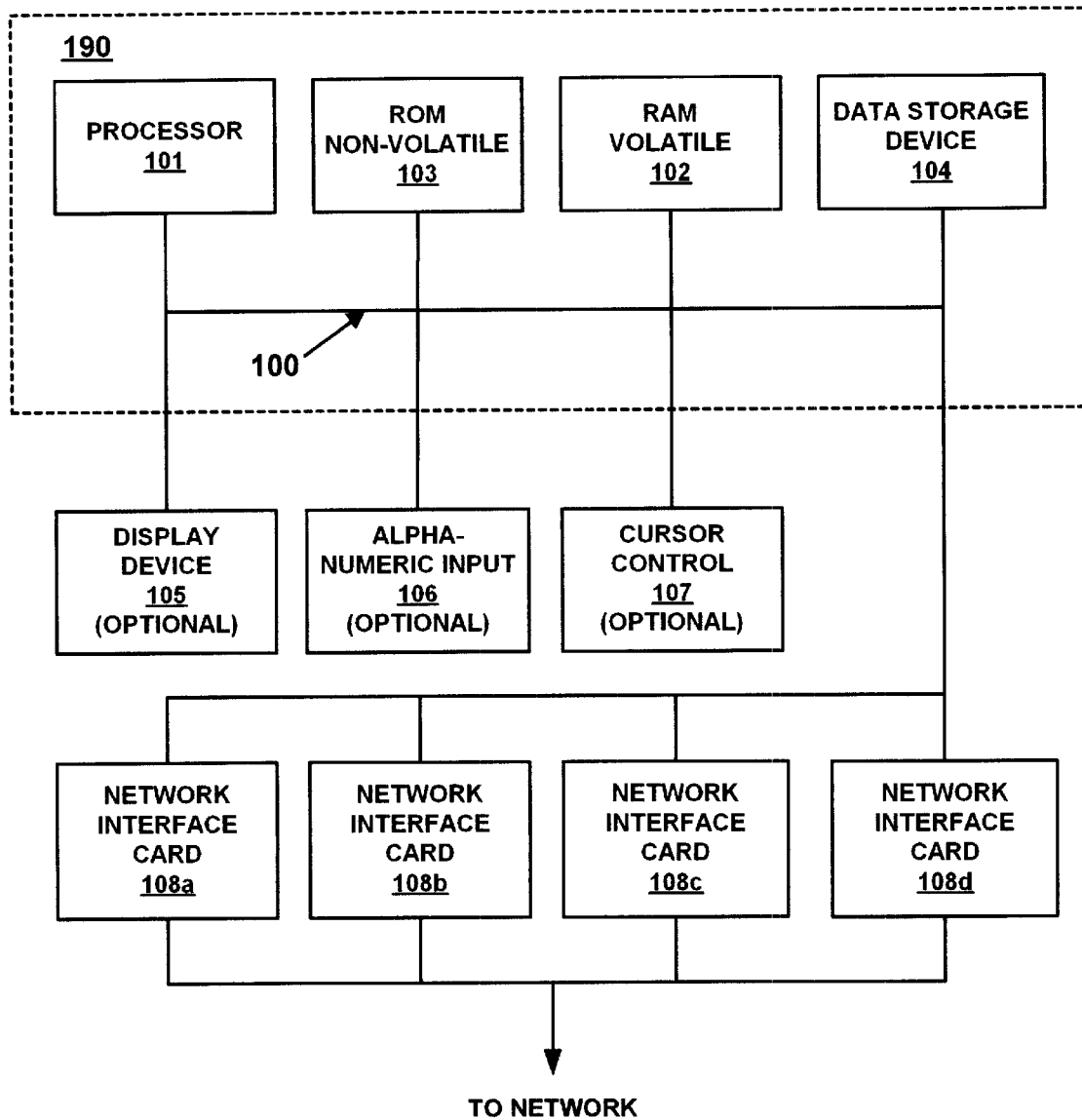
FIG. 2A shows a general purpose server computer system upon which embodiments of the present invention may be implemented.

Refer to FIG. 2A which illustrates an exemplary server computer system 190 upon which embodiments of the present invention may be practiced. Server computer system 190 is communicatively coupled to other computer systems (not shown) in a network. In one embodiment, server computer system 190 is compliant with IEEE standard 802.1Q.

In general, server computer system 190 used by the embodiments of the present invention comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, an optional display device 105 coupled to bus 100 for displaying information to the computer user, an optional alphanumeric input device 106 including alphanumeric and function keys coupled to bus 100 for communicating information and command selections to central processor 101, and an optional cursor control device 107 coupled to bus 100 for communicating user input information and command selections to central processor 101.

Display device 105 of FIG. 2A utilized with server computer system 190 of the present embodiment may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

Continuing with reference to FIG. 2A, server computer system 190 is adapted to be coupled via bus 100 to a plurality of network interface cards (NICs) exemplified by NICs 108a, 108b, 108c and 108d. NICs 108a–d provide the physical link to communicatively couple server computer system 190 to a network of client computer systems and other server computer systems (not shown). Any of a number of different and well known types of NICs may be used to communicate with the network of client and server computer systems. It is appreciated that any number of NICs may be utilized in accordance with the present invention. It is further appreciated that NICs 108a–d may be integrated into server computer system 190 or they may be externally coupled to server computer system 190. Each of NICs 108a–d has a unique media access control (MAC) address.

Figure 2B:
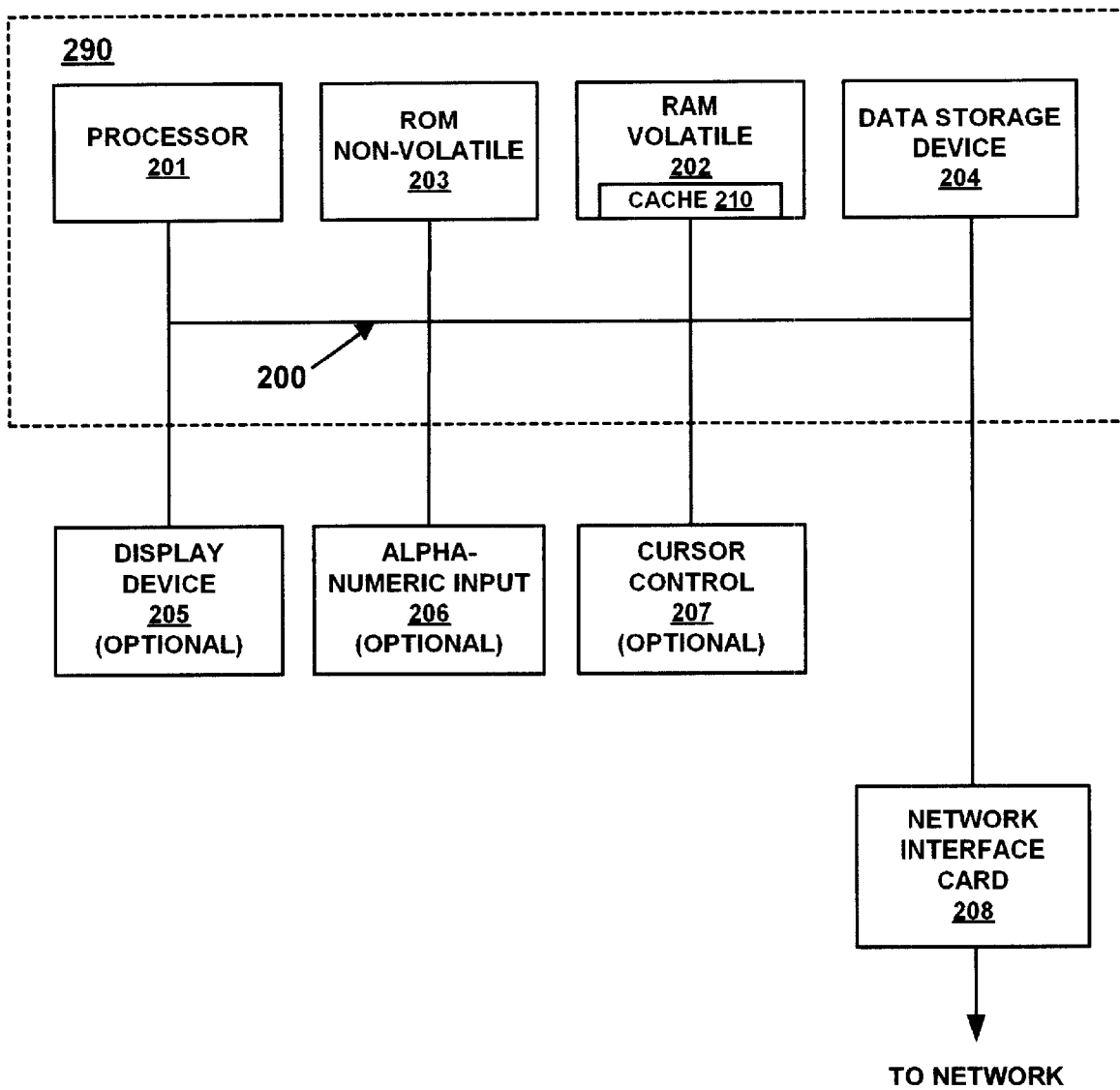
FIG. 2B shows a general purpose client computer system upon which embodiments of the present invention may be implemented.

FIG. 2B illustrates an exemplary client computer system 290 upon which embodiments of the present invention may be practiced. Client computer system 290 is communicatively coupled to other computer systems (not shown) in a network. In general, bus 200, processor 201, random access memory 202, read-only memory 203, data storage device 204, optional display device 205, optional alphanumeric input device 206, optional cursor control device 207, and display device 205 are as described in conjunction with FIG. 2A.

Client computer system 290 also includes a memory cache 210. In the present embodiment, cache 210 is included in random access memory 202 although it may be otherwise implemented in accordance with the present invention. Cache 210 is used to affiliate a network address (e.g., an Internet Protocol address, an Internetwork Protocol Exchange address, etc.) with the unique MAC address for a particular NIC. Thus, cache 210 is used by client computer system 290 to provide both the network address and the MAC address for a desired destination, such as NIC 108a of server computer system 190.

Client computer system 290 typically utilizes a single NIC (e.g., NIC 208). NIC 208 is used to communicatively couple client computer system 290 to a computer system network (not shown) comprised of one or more server computer systems and other client computer systems.

FIG. 3 illustrates one embodiment of cache 210 that is used in accordance with the present invention. In the present embodiment, cache 210 is represented as a table in which a MAC address is provided as a function of a network address; thus, cache 210 can be used to determine the MAC address for a particular node on the network when only the network address for that node is known. One entry is shown in cache 210 although it is understood that cache 210 may contain any number of entries.

As described above, server computer system 190 (FIG. 2A) has multiple NICs, each with its own unique MAC address. Cache 210 is used to associate the MAC address for one of the NICs (e.g., NIC 108a of FIG. 2A) with the network address for server computer system 190. Cache 210 can be subsequently changed to associate the MAC address for a different NIC (e.g., NIC 108b) with the same network address. As will be seen, when a NIC fails, in accordance with the present invention the functions of the failed NIC are switched to a different NIC. Accordingly, cache 210 is readily and automatically updated so that the MAC address for the new NIC is associated with the network address for server computer system 190. Thus, a client computer system that was communicatively coupled to server computer system 190 via the failed NIC is automatically and quickly coupled to server computer system 190 via the new NIC. Additional details are provided in conjunction with FIG. 10.

FIG. 4 illustrates one embodiment of broadcast data packet 400 used to update cache 210 (FIG. 3) with the MAC address for a new NIC in the event of failure of a NIC. In the present embodiment, broadcast data packet 400 is compliant with Address Resolution Protocol (ARP). In the present embodiment, broadcast data packet 400 is broadcast to all client computer systems after a failed NIC is detected and a functioning NIC has been selected to replace the failed NIC. Accordingly, destination address 411 is a broadcast address. Source network address 416 is the network address (e.g., the Internet Protocol address) for server computer system 190 (FIG. 2A). Source MAC 417 is the MAC address for the new NIC (the NIC replacing the failed NIC); that is, source MAC 417 is the MAC address for the NIC that client computer system 290 (FIG. 2B) is to use when sending a data packet to server computer system 190 in lieu of the failed NIC.

Figure 5:
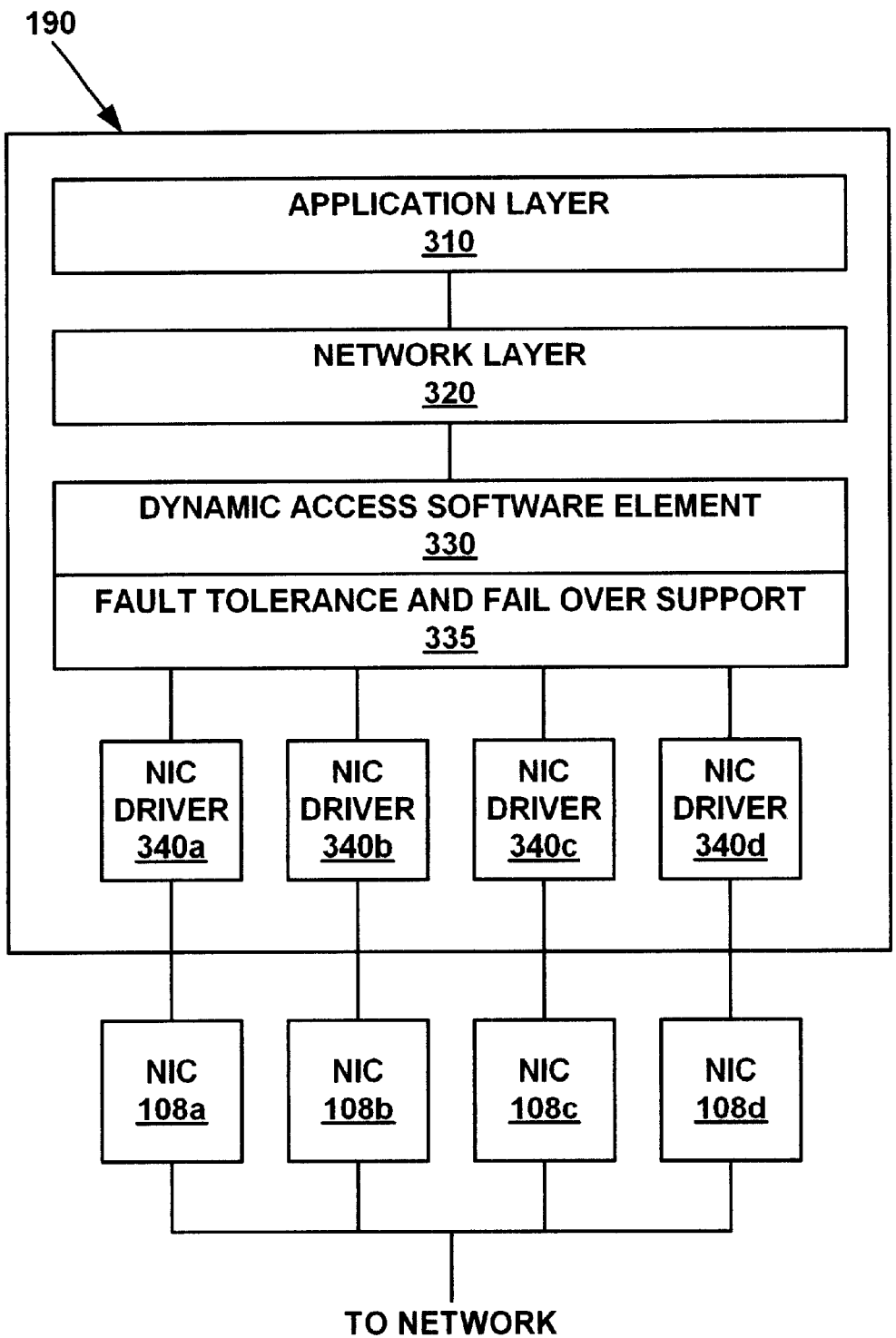
FIG. 5 is a hardware and software data flow diagram of the logical components of the server computer system of FIG. 2A in accordance with one embodiment of the present invention.

FIG. 5 is a hardware and software data flow diagram of the logical components of server computer system 190 in accordance with one embodiment of the present invention. In the present embodiment, application layer 310 and network layer 320 are software elements having the functions and responsibilities defined by the well-known International Standards Organization/Open System Interconnection (ISO/OSI) reference model; however, it is appreciated that the present invention is not limited to this type of configuration or the ISO/OSI reference model. Application layer 310 and network layer 320 constitute a portion of the software elements in server computer system 190 commonly referred to as the protocol stack; it is understood that for simplicity only the relevant layers of the ISO/OSI reference model are shown in FIG. 5.

In the present embodiment, application layer 310 defines the manner in which application programs (e.g., computer software programs, word processors, database management systems, electronic mail, and the like) interact with the communication network. Network layer 320 contains the computer-to-computer or computer-to-network protocol that defines the procedures to be followed when data packets are transmitted and received. The protocols used by network layer 320 include, for example, IP (Internet Protocol), IPX (Internetwork Packet Exchange), or other protocols known in the art. Network layer 320 is responsible for determining addresses or for translating hardware addresses to network addresses.

Continuing with reference to FIG. 5, server computer system 190 is adapted to have multiple NICs; for illustration purposes, only four NICs 108a–d are shown, although it is appreciated that any number of NICs may be used in accordance with the present invention. Associated with each of NICs 108a–d are NIC drivers 340a–d, respectively. In the ISO/OSI reference model, NICs 108a–d correspond to the physical layer and NIC drivers 340a–d correspond to the data-link layer. NIC drivers 340a–d provide an interface for the protocols of network layer 320. NIC drivers 340a–d also provide media access control; that is, they provide access to the particular physical encoding and transport scheme used by NICs 108a–d. As described above, NICs 108a–d provide the physical connection to the network.

In the present embodiment, one of NICs 108a–d is selected by the network manager as the "primary NIC." The primary NIC is used to transmit all broadcast and multicast data packets. In this embodiment, the other NICs are referred to as "secondary NICs" and are used to send directed data packets. All NICs 108a–d receive broadcast data packets. Because one NIC is designated for transmitting broadcast and multicast data packets, these packets are not unnecessarily duplicated over multiple NICs and, in addition, duplicate acknowledgments are not unnecessarily sent in response. Thus, traffic over the network is minimized.

In the present embodiment, the present invention includes a software element (e.g., fault tolerance and fail over support 335) introduced into server computer system 190 between network layer 320 and NIC drivers 340a–d. Fault tolerance and fail over support 335 is used to determine whether a NIC is functioning and to automatically switch the functions of a failed NIC to a functioning NIC. For example, if the primary NIC should fail, then one of the secondary NICs would take over the function of transmitting broadcast and multicast data packets. Fault tolerance and fail over support 335 also sends out a broadcast message (e.g., broadcast data packet 400 of FIG. 4) that automatically causes the client computer systems on the network (e.g., client computer system 290 of FIG. 2B) to update their cache memory (e.g., cache memory 210 of FIGS. 2B and 3) with the MAC address of the functioning NIC.

By integrating fault tolerance and fail over support 335 into server computer system 190, the present embodiment of the present invention takes advantage of the abundant resources (e.g., processing power and memory) available in a server computer system. In addition, because fault tolerance and fail over support 335 is incorporated entirely into server computer system 190, it is switch-independent and thus can be used with different types of switches including legacy devices. Correspondingly, the present invention eliminates the need for complex switches. As will be seen by the discussion below, there are a number of other advantages associated with the present invention.

With reference still to FIG. 5, in one embodiment, fault tolerance and fail over support 335 is implemented as one module of dynamic access software element 330. In general, dynamic access software element 330 represents a system and method for sending and receiving data packets over a network of computer systems from a server computer system having a plurality of NICs coupled thereto. Dynamic access software element 330 may incorporate features such as load balancing, class of service (for assigning a priority to outgoing data packets), and multicast registration. It is appreciated that the present invention fault tolerance and fail over support 335 is not limited to implementation with dynamic access software element 330.

In one embodiment, dynamic access software element 330 consists of a protocol and a MAC driver. A virtual MAC is created by dynamic access software element 330 for each virtual local area network (VLAN) included in the computer system network. Similarly, a virtual MAC can correspond to a unique IP and subnet address. The virtual MAC address is used to represent the MAC addresses of NICs 108a–d to network layer 320.

Figure 6:
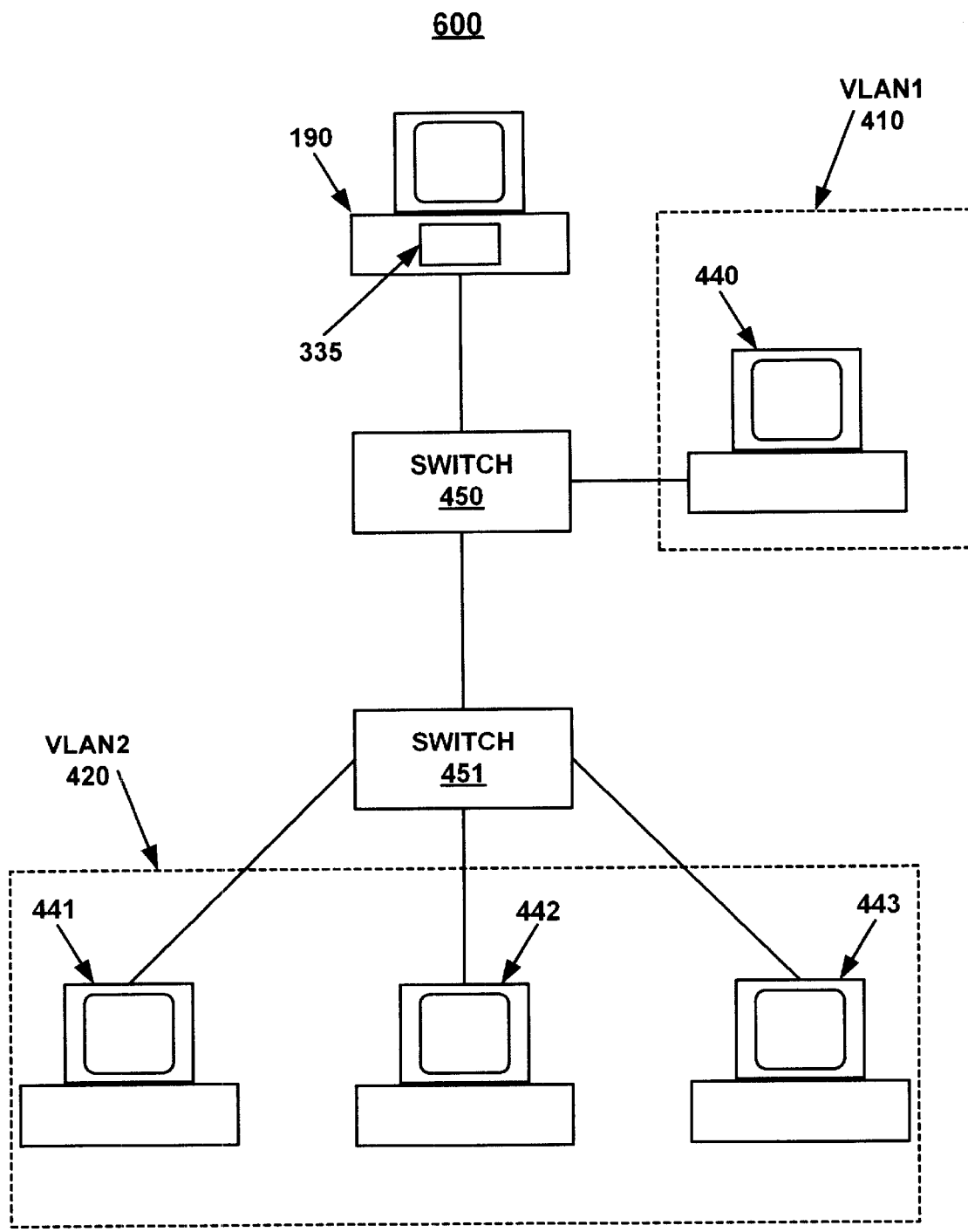
FIG. 6 is a block diagram of an exemplary computer system network including the server computer system of FIG. 2A upon which embodiments of the present invention may be implemented.

FIG. 6 is a block diagram of an exemplary network 400 comprised of server computer system 190 incorporating fault tolerance and fail over support 335 and coupled to VLAN1 410 and VLAN2 420 via switches 450 and 451. VLAN1 410 is comprised of client computer system 440, and VLAN2 420 is comprised of client computer systems 441, 442 and 443. In this embodiment, network 400 is compliant with IEEE standard 802.1Q. It is appreciated that other network configurations made up of different numbers of components may be utilized in accordance with the present invention. In accordance with the present invention, switches 450 and 451 may be any of a variety of well known switches.

Figure 7A:
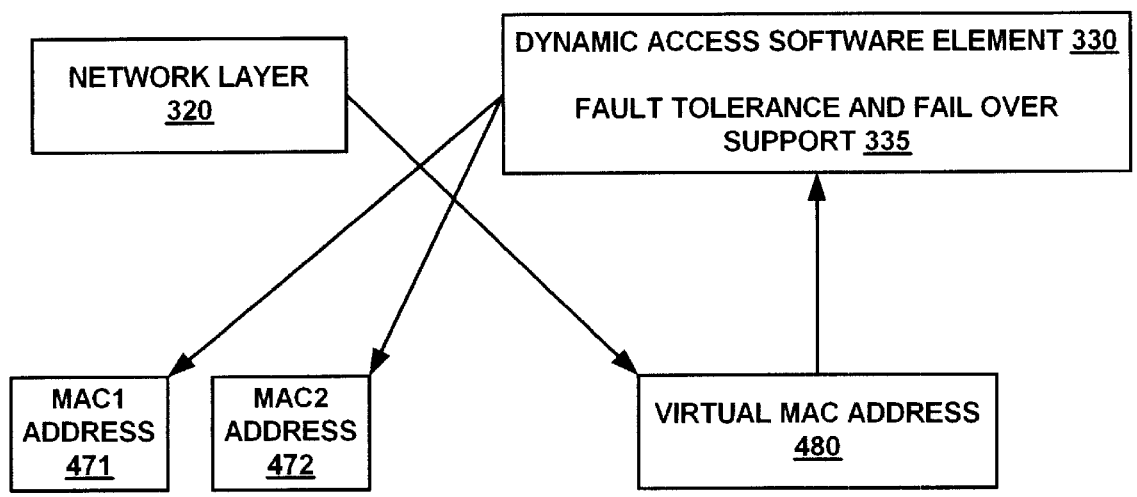
FIGS. 7A and 7B are block diagrams of the software configuration of the server computer system of FIG. 2A in accordance with one embodiment of the present invention.
Figure 7B:
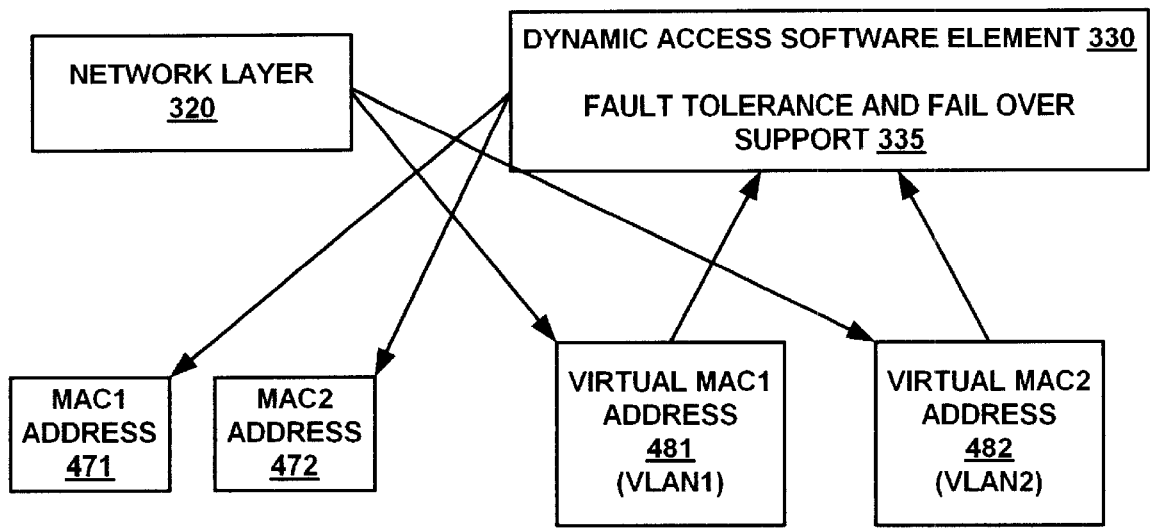

FIGS. 7A and 7B represent the software configuration of server computer system 190 (FIG. 2A) for various implementations of one embodiment of the present invention. These figures indicate the direction of an outgoing data packet from server computer system 190; it is understood that the direction of an incoming data packet is the opposite of that indicated in FIGS. 7A and 7B. All requests, sets and gets also follow the paths indicated. It is also appreciated that for simplicity of discussion, only two NICs and two VLANs are presented; however, any number of NICs and VLANs may be utilized in accordance with the present invention.

With reference to FIG. 7A, server computer system 190 has two NICs coupled thereto represented, respectively, by MAC1 address 471 and MAC2 address 472. The network comprises a single VLAN (e.g., VLAN1 410). With multiple NICs, fault tolerance and fail over support 335 is enabled in accordance with the present invention. In the present embodiment, fault tolerance and fail over support 335 is implemented via dynamic access software element 330.

In the present embodiment, dynamic access software element 330 creates virtual MAC address 480 corresponding to VLAN1 410. Virtual MAC address 480 is registered with the Network Driver Interface Specification (NDIS) wrapper. Accordingly, network layer 320 is bound to virtual MAC address 480, which in turn is bound to dynamic access software element 330, which in turn is bound to MAC1 address 471 and MAC2 address 472. Hence, network layer 320 is not bound directly to MAC1 address 471 and MAC2 address 472 except through virtual MAC address 480 and dynamic access software element 330.

Continuing with reference to FIG. 7A, virtual MAC 480 represents both MAC1 address 471 and MAC2 address 472 to network layer 320. That is, from the perspective of network layer 320, the NICs appear to be a single NIC with a single MAC address (the virtual MAC address). Thus, network layer 320 specifies a single MAC address (the virtual MAC address) in an outgoing data is packet. Dynamic access software element 330 executes a load balancing scheme to select one of the NICs to be used to transmit the outgoing data packet. Dynamic access software element 330 also executes fault tolerance and fail over support 335 to determine whether the selected NIC is functioning; if not, a different NIC is substituted for the selected NIC. Dynamic access software element 330 then converts the virtual MAC address (the address specified by network layer 320) into the MAC address corresponding to the NIC that will be used to transmit the data packet. Additional details are provided below in conjunction with FIGS. 8 and 9.

With reference to FIG. 7B, server computer system 190 has two NICs coupled thereto represented by MAC1 address 471 and MAC2 address 472, respectively. The network comprises two VLANs (e.g., VLAN1 410 and VLAN2 420). With multiple NICs, fault tolerance and fail over support 335 is enabled. In the present embodiment, fault tolerance and fail over support 335 is implemented via dynamic access software element 330.

In the present embodiment, dynamic access software element 330 creates virtual MAC1 address 481 and virtual MAC2 address 482 which correspond to VLAN1 410 and VLAN2 420, respectively. Virtual MAC1 address 481 and virtual MAC2 address 482 are registered with the NDIS wrapper. Accordingly, network layer 320 is bound to both virtual MAC1 address 481 and virtual MAC2 address 482, which in turn are bound to dynamic access software element 330, which in turn is bound to MAC1 address 471 and MAC2 address 472.

Continuing with reference to FIG. 7B, virtual MAC 480 represents both MAC1 address 471 and MAC2 address 472 to network layer 320. That is, from the perspective of network layer 320, the NICs appear to be a single NIC with a single MAC address (the virtual MAC address). Thus, network layer 320 specifies a single MAC address (the virtual MAC address) in an outgoing data packet. Network layer 320 also specifies the virtual MAC address corresponding to the VLAN that is the destination of the outgoing data packet. Dynamic access software element 330 executes a load balancing scheme to select one of the NICs to be used to transmit the outgoing data packet. Dynamic access software element 330 also executes fault tolerance and fail over support 335 to determine whether the selected NIC is functioning; if not, a different NIC is substituted for the selected NIC. Dynamic access software element 330 then converts the virtual MAC address (the address specified by network layer 320) into the MAC address corresponding to the NIC that will be used to transmit the data packet. Dynamic access software element 330 also inserts the actual VLAN identifier for the destination VLAN. Additional details are provided below in conjunction with FIGS. 8 and 9.

Figure 8:
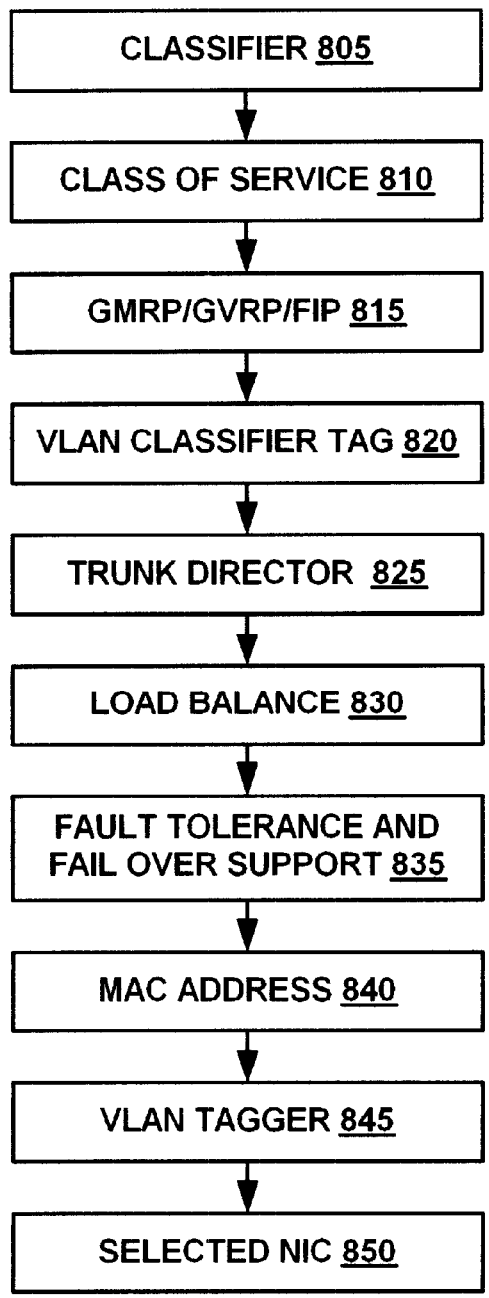
FIG. 8 is a flowchart of one embodiment of the process executed for an outgoing data packet in accordance with the present invention.

FIG. 8 is a flowchart of one embodiment of process 800 executed by dynamic access software element 330 to implement fault tolerance and fail over support 335 for an outgoing data packet in accordance with the present invention. Process 800 includes a number of features in addition to fault tolerance and fail over support 335 that can be implemented by dynamic access software element 330; however, it is appreciated that in alternate embodiments a subset of these features may be used, and that in other embodiments other features (e.g., snap-ins) not described herein may be implemented.

In step 805, dynamic access software element 330 receives a data packet from network layer 320. The outgoing data packet contains the MAC address specified by network layer 320; as described above, network layer 320 is bound to dynamic access software element 330 so the address specified by network layer 320 is actually the virtual MAC address (e.g., virtual MAC1 address 481 of FIG. 7B). The operations performed by dynamic access software element 330 are transparent to network layer 320, and therefore in effect network layer 320 believes it is addressing the outgoing data packet in a normal fashion. Network layer 320 utilizes a protocol such as IP, IPX, etc. Dynamic access software element 330 classifies the outgoing data packet according to the protocol being used and indicates the pointers to all of the relevant protocol headers.

In step 810, a class of service snap-in module can be used to prioritize the outgoing data packet according to the class of service specified by the user or network administrator. The outgoing data packet is placed in a queue according to its priority or is sent immediately through the remaining steps of process 800. Various class of service schemes can be implemented in accordance with the present invention.

In step 815, a snap-in module can be used to incorporate protocols being implemented by server computer system 190 (FIG. 2A). These protocols include Fast IP (FIP), generic attributes registration protocol (GARP) multicast registration protocol (GMRP), and GARP VLAN registration protocol (GVRP). Various protocols can be implemented in accordance with the present invention.

In step 820, a VLAN tag is inserted into the header of the outgoing data packet. The tag corresponds to the protocol header identified in step 805.

In step 825, the trunk director detects which load balance scheme is utilized in step 830. Various load balancing schemes can be implemented in accordance with the present invention.

In step 830, the load balance scheme utilized by dynamic access software element 330 is executed. In the present embodiment, the load balance scheme is a snap-in module, and therefore different schemes can be incorporated. The load balance scheme identifies the NIC to be used to transmit the outgoing data packet.

In step 835, fault tolerance and fail over support 335 utilized by dynamic access software element 330 is employed. In the present embodiment, the fault tolerance module is a snap-in module. It is appreciated that the fault tolerance module does not have to be in the data stream but can perform its function in the background. The fault tolerance scheme can be utilized without load balancing.

Fault tolerance and fail over support 335 is used to determine whether the NIC selected in step 830 is functioning. Fault tolerance and fail over support 335 monitors the NICs and maintains a list of MAC addresses for NICs that are active. Monitoring of the NICs is accomplished using directed packets (e.g., "keep-alive packets") that are sent by each NIC to one or more of the other NICs. Fault tolerance and fail over support 335 monitors the directed data packets to determine whether or not they are being properly transmitted and received. In one embodiment, an indication (e.g., a cable disconnect message or a link lost status message) is also provided to fault tolerance and fail over support 335 when the directed packet from the first NIC is not received by one of the other NICs or when one of the directed packets from one of the other NICs is not received by the first NIC. Based on the monitoring, fault tolerance and fail over support 335 determines whether a NIC has failed. Additional details are provided in conjunction with FIG. 10.

Continuing with reference to step 835 of FIG. 8, fault tolerance and fail over support 335 dynamically adds and removes MAC addresses from the list depending on the status of each NIC. When the selected NIC is found to be non-functioning (e.g., it is not on the list), a different NIC from the list is used to replace the failed NIC. Fault tolerance and fail over support 335 also automatically transfer the functions from the failed NIC to the replacement NIC. Fault tolerance and fail over support 335 then sends a broadcast message (e.g., broadcast data packet 400 of FIG. 4) to the client computer systems on the network and directs them to update their memory cache (e.g., cache 210 of FIG. 3) with the MAC address of the replacement NIC, and to associate that MAC address with the network address of the server computer system.

In step 840, the true MAC address corresponding to the NIC selected in steps 830 and 835 (e.g., MAC1 address 471 of FIGS. 7A and 7B) is inserted into the outgoing data packet in place of the virtual MAC address initially specified by network layer 320.

In step 845, the identifier for the destination VLAN is added to the address of the outgoing data packet per IEEE standard 802.1Q. If only one VLAN is present in the network, then the outgoing data packet passes through this step without modification.

In step 850, the outgoing data packet is forwarded to the selected NIC (see steps 830 and 835), then transmitted out to and over the network.

Figure 9:
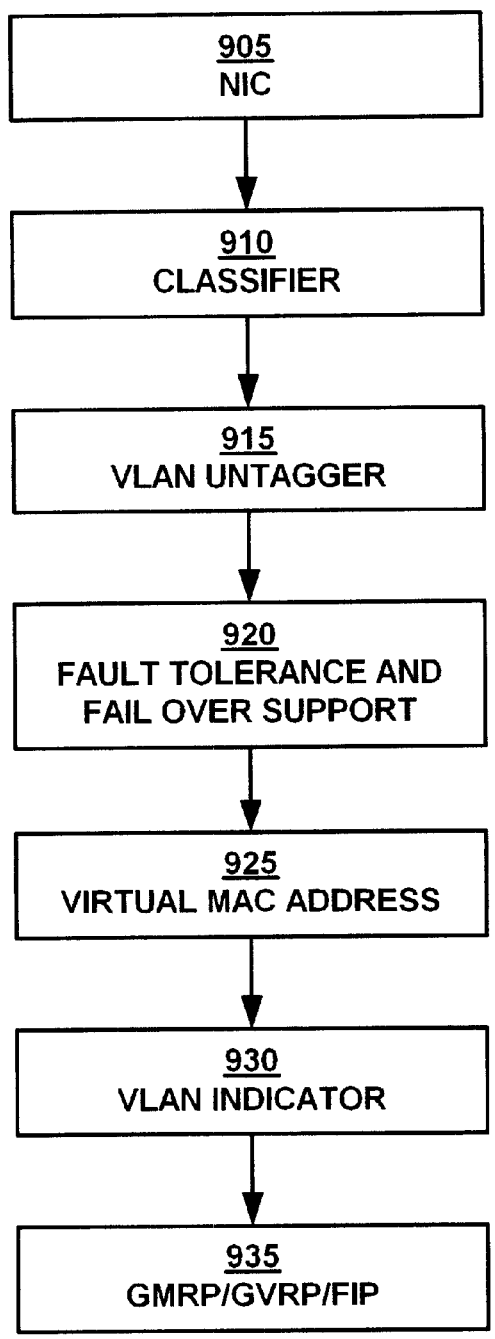
FIG. 9 is a flowchart of one embodiment of the process executed for an incoming data packet in accordance with the present invention.

FIG. 9 is a flowchart of one embodiment of process 900 executed by dynamic access software element 330 for an incoming data packet in accordance with the present invention. Process 900 includes a number of features that can be implemented by dynamic access software element 330; however, it is appreciated that in alternate embodiments a subset of these features may be used, and that in other embodiments other features (e.g., snap-ins) not described herein may be implemented.

In step 905, the incoming data packet is received at a NIC. The NIC is bound to dynamic access software element 330 (see FIGS. 7A and 7B), so the incoming data packet is directly forwarded there.

In step 910, the incoming data packet is classified according to the protocol being used (e.g., IP, IPX, etc.) and the VLAN it came from. The VLAN identifier is used to determine to which virtual MAC address the incoming data packet is to proceed. Because only the VLAN identifier is examined, processing of an incoming data packet is minimized. As described by step 905, the data packet is also classified according to the protocol being used.

In step 915, the VLAN identifier is removed from the incoming data packet if a VLAN identifier is present (refer to step 845 of FIG. 8).

In step 920, fault tolerance and fail over support 335 determines whether the incoming data packet is a directed "keep-alive" data packet (see step 835 of FIG. 8). Directed data packets are sent to and from the various NICs as a means for determining whether a NIC is functioning. These data packets contain no data and hence do not need to continue along the data path to network layer 320 (FIG. 5). Accordingly, fault tolerance and fail over support 335 does not forward directed keep-alive data packets. Otherwise, the data packet is forwarded through the remaining steps of process 900.

In step 925, the true MAC address (e.g., MAC1 address 471) is replaced with the virtual MAC address (e.g., virtual MAC1 address 481) based on the virtual MAC address selected in step 910. As explained above, the operations of dynamic access software element 330 are transparent to network layer 320. For example, an outgoing data packet may be sent out over one NIC and an incoming data packet received in response to the outgoing data packet may be received over a different NIC. However, network layer 320 is looking for the MAC address it used to address the outgoing data packet (see step 805 of FIG. 8). Thus, dynamic access software element 330 provides the MAC address that network layer 320 is expecting. In this manner, a group of NICs is represented to network layer 320 as a single NIC.

In step 930, dynamic access software element 330 determines which protocol to bind the incoming data packet to based on the classification information from step 910.

In step 935, the incoming data packet is examined by the GMRP, GVRP or FIP snap-in modules and treated accordingly if these protocols are being used. The incoming data packet is then forwarded to network layer 320 if appropriate (e.g., GMRP and GVRP data packets are not forwarded).

Figure 10:
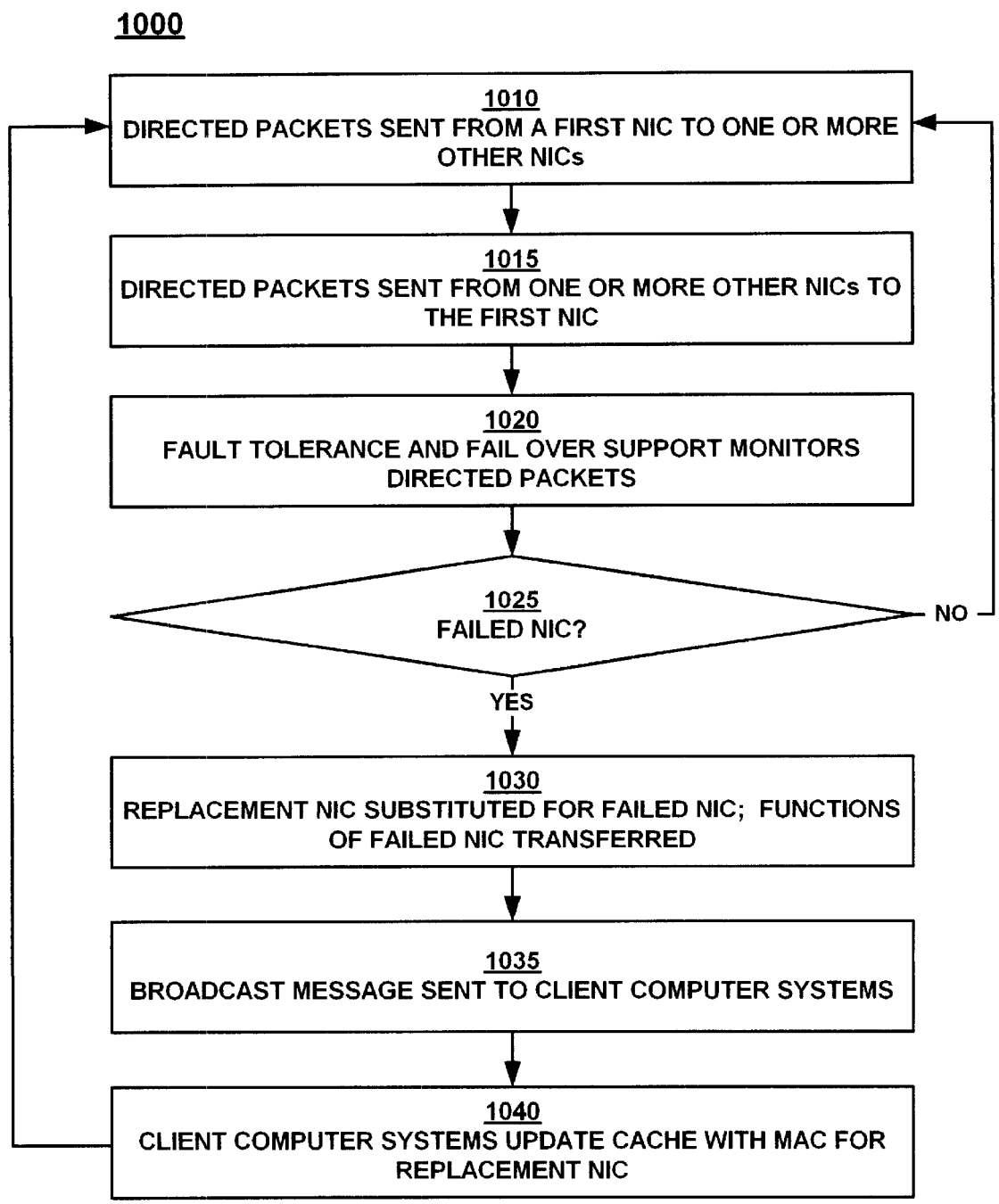
FIG. 10 is a flowchart of the process for fault tolerance and fail over support in accordance with one embodiment of the present invention.

FIG. 10 is a flowchart of process 1000 for fault tolerance and fail over support in accordance with one embodiment of the present invention. In the present embodiment, process 1000 is executed by fault tolerance and fail over support 335 (FIG. 5) as computer-readable instructions in server computer system 190 (FIG. 2A).

In step 1010, in the present embodiment, for the case in which there are more than two NICs coupled to server computer system 190, each NIC sends a directed packet (e.g., a "keep-alive" packet) to two other NICs. For example, NIC 108a (FIG. 2A) transmits a directed data packet to each of NICs 108b and 108d (FIG. 2A). Likewise, NIC 108b transmits a directed data packet to NICs 108a and 108c, and so on. Thus, in the present embodiment, each NIC transmits two directed data packets, one directed data packet to one NIC and the second directed data packet to another NIC. In the present embodiment, the directed packets are transmitted approximately every second, although it is appreciated that a different time interval may be used in accordance with the present invention.

In step 1015 of FIG. 10, NICs 108*b* and 108*d* each send a directed packet to NIC 108*a*, NICs 108*a* and 108*c* each send a directed packet to NIC 108*b*, and so on. Thus, in the present embodiment, each NIC receives two directed data packets, one from each of the NICs to which it sent a directed data packet (step 1010). It is appreciated that other schemes may be used for sending and receiving directed data packets among the multiple NICs, in which for example the number of data packets sent or the order in which they are sent is different. It is also appreciated that each NIC could send directed packets to one or more NICs and receive directed packets from a different NIC or NICs; that is, in other embodiments, a NIC can receive a directed data packet from a NIC other than the NIC to which it sent a directed data packet.

In step 1020, fault tolerance and fail over support 335 monitors the NICs and the directed packets to determine which the directed packets are sent and received. By monitoring which directed data packets are sent and received by which NIC, enough information is provided to fault tolerance and fail over support 335 to allow it to deduce whether a NIC has failed even if the failure is only a partial failure (that is, a failure by the NIC to either transmit or receive properly). Also, sufficient information is available to allow fault tolerance and fail over support 335 to specifically identify which NIC has failed.

In one embodiment, an indication is provided to fault tolerance and fail over support 335 when the directed packet from the first NIC is not received by one of the subset of NICs or when one of the directed packets from each of the subset of NICs is not received by the first NIC. In this embodiment, the indication is a cable disconnect message or a link lost status message. In this embodiment, the indication is considered in combination with the monitoring of the directed data packets. to determine whether a NIC has failed.

In step 1025, if there are no failed NICs, steps 1010, 1015 and 1020 continue to be repeated; that is, directed data packets are sent and received by each NIC at the specified time interval and fault tolerance and fail over support 335 continues to monitor the directed data packets.

In step 1030, a failed NIC is automatically replaced with a functioning NIC from the list of NICs maintained by fault tolerance and fail over support 335 (see step 835 of FIG. 8). In addition, the functions performed by the failed NIC are automatically transferred to the replacement NIC. For example, if a primary NIC fails, the associated broadcast and multicast functions are transferred to the replacement NIC. Thus, in combination with step 1020, a failed NIC is quickly identified, isolated, and replaced with a functioning NIC, thus minimizing the time during which a client computer system and the server computer system are not in communication.

In step 1035, fault tolerance and fail over support 335 automatically sends broadcast data packet 400 (FIG. 4) to the client computer systems on the network. Broadcast data packet 400 contains the MAC address of the replacement NIC and the network address (e.g., IP address) of the server computer system.

In step 1040, each client computer system updates cache 210 (FIG. 3) with the information provided by broadcast data packet 400. Thus, each client computer system is automatically provided with sufficient information needed to address a data packet to be sent to server computer system 190 (FIG. 2A) via the replacement NIC.

For the case in which server computer system 190 has only one NIC, the failure of the NIC is based on the NIC indicating a cable failure. For example, for TCP/IP protocol, the NIC transmits an ICMP (Internet Control Message Protocol) echo message to the last known IP address and awaits a reply. A reply to the ICMP echo message. indicates a good cable that can transmit and receive reliably.

For the case in which server computer system 190 has two NICs, each NIC sends a directed data packet to the other NIC. When either of the two NICs does not receive the directed data packet, it indicates an abnormality in the network. In one embodiment, fault tolerance and fail over support 335 assumes that the NIC that did not receive the directed data packet is failed.

In summary, in one embodiment the present invention provides a method and system for fault tolerance and fail over support wherein the method and system are contained in and implemented by a server computer system. The present invention can be used with multiple NICs in a multiple VLAN environment. The present embodiment of the present invention is designed as a distinct software module that is inserted between the protocol stack (e.g., the network layer) in the server computer system and the NIC drivers. As such, the present invention is implemented without having to modify the existing protocols and software used by the server computer system. In one embodiment, the present invention is implemented using a dynamic access software element that provides other features and snap-ins such as load balancing.

The present invention is independent of the types of switches, routers, or other hardware used in the computer system network and is not limited by the capability of a switch. Legacy devices and software can therefore be used with the present invention. The software solution provided by the present embodiment of the present invention minimizes costs because it is integrated at the software level and hardware modifications and upgrades are not necessary.

The use of fault tolerance and fail over support allows the spare capacity provided by the multiple NICs to be effectively utilized. It is not necessary to hold a NIC in reserve in case one of the NICs fails; instead, all NICs can be used, thereby increasing the overall performance of the server computer system and hence the network.

The present invention detects NIC failures including partial NIC failures (such as the inability of the NIC to either send or receive), and can identify which NIC has failed. In addition, the present invention quickly accomplishes fail over to a functioning NIC and thereby minimizes the time during which the communication link between the server computer system and client computer systems is not available. Thus, the overall reliability and performance of the server computer system and the network are improved.

The preferred embodiment of the present invention, fault tolerance and fail over with multiple network interface cards, is thus described. While the present invention has been described in particular embodiments, it should be appreciated that the present invention should not be construed as limited by such embodiments, but rather construed according to the following claims.

What is claimed is:

1. In a server computer system communicatively coupled to a client computer system in a network, said server computer system adapted to have a plurality of network interface cards (NICs) coupled thereto, a method for detecting a non-functioning NIC comprising the computer-implemented steps of:

a) sending a first directed packet from a first NIC to a second NIC;

b) sending a second directed packet from said second NIC to said first NIC;

c) monitoring said second NIC to determine whether said first directed packet is received by said second NIC and providing an indication to said server system when said first directed packet is not received by said second NIC;

d) monitoring said first NIC to determine whether said second directed packet is received by said first NIC; and e) determining whether said first NIC is functioning using results from said steps c) and d).

2. The method for detecting a non-functioning NIC as recited in claim 1, wherein said steps a) through d) further comprise:

sending said first directed packet from said first NIC to a first plurality of NICs;

sending a directed packet from each of a second plurality of NICs to said first NIC;

monitoring said first plurality of NICs to determine whether said first directed packet is received by said first plurality of NICs; and monitoring said first NIC to determine whether each directed packet sent by said second plurality of NICs is received by said first NIC.

3. The method for detecting a non-functioning NIC as recited in claim 2 further comprising the step of:

f) automatically substituting one of said plurality of NICs for said first NIC when said first NIC is determined to be non-functioning.

4. The method for detecting a non-functioning NIC as recited in claim 3 further comprising the steps of:

g) sending a data packet from said server computer system to said client computer system, wherein said data packet contains a media access control (MAC) address for said one of said plurality of NICs; and h) replacing a MAC address for said first NIC with said MAC address for said one of said plurality of NICs in a memory cache in said client computer system.

5. The method for detecting a non-functioning NIC as recited in claim 1 further comprising:

sending said first directed packet from said first NIC to said client computer system; and monitoring said first NIC to determine whether a response to said first directed packet is received from said client computer system.

6. The method for detecting a non-functioning NIC as recited in claim 1 wherein said indication is a cable disconnect message.

7. The method for detecting a non-functioning NIC as recited in claim 1 wherein said step d) comprises:

providing an indication to said server computer system when said second directed packet is not received by said first NIC.

8. The method for detecting a non-functioning NIC as recited in claim 7 wherein said indication is a cable disconnect message.

9. A server computer system communicatively coupled to a client computer system in a network, said server computer system comprising:

a bus;

a processor coupled to said bus; and a computer-readable memory unit coupled to said bus;

said server computer system adapted to have a plurality of network interface cards (NICs) coupled thereto;

said processor for performing a method for detecting a non-functioning NIC comprising the computer-implemented steps of:

a) sending a first directed packet from a first NIC to a second NIC;

b) sending a second directed packet from said second NIC to said first NIC;

c) monitoring said second NIC to determine whether said first directed packet is received by said second NIC;

d) monitoring said first NIC to determine whether said second directed packet is received by said first NIC and providing an indication to said server computer system when said second directed packet is not received by said first NIC; and e) determining whether said first NIC is functioning using results from said steps c) and d).

10. The computer system of claim 9 wherein said processor performs said method for detecting a non-functioning NIC further comprising the steps of:

sending said first directed packet from said first NIC to said client computer system; and monitoring said first NIC to determine whether a response to said first directed packet is received from said client computer system.

11. The computer system of claim 9 wherein said processor performs said method for detecting a non-functioning NIC wherein said steps a) through d) further comprise:

sending said first directed packet from said first NIC to a first plurality of NICs;

sending a directed packet from each of a second plurality of NICs to said first NIC;

monitoring said first plurality of NICs to determine whether said first directed packet is received by said first plurality of NICs; and monitoring said first NIC to determine whether each directed packet sent by said second plurality of NICs is received by said first NIC.

12. The computer system of claim 11 wherein said processor performs said method for detecting a non-functioning NIC further comprising the step of:

f) automatically substituting one of said plurality of NICs for said first NIC when said first NIC is determined to be non-functioning.

13. The computer system of claim 12 wherein said processor performs said method for detecting a non-functioning NIC further comprising the steps of:

g) sending a data packet from said server computer system to said client computer system, wherein said data packet contains a media access control (MAC) address for said one of said plurality of NICs; and h) replacing a MAC address for said first NIC with said MAC address for said one of said plurality of NICs in a memory cache in said client computer system.

14. The computer system of claim 9 wherein said processor performs said method for detecting a non-functioning NIC wherein said step c) comprises:

providing an indication to said server system when said first directed packet is not received by said second NIC.

15. The computer system of claim 14 wherein said processor performs said method for detecting a non-functioning NIC wherein said indication is a cable disconnect message.

16. The computer system of claim 9 wherein said processor performs said method for detecting a non-functioning NIC wherein said indication is a cable disconnect message.

17. A computer-usable medium having computer readable program code embodied therein for causing a server computer system adapted to have a plurality of network interface cards (NICs) coupled thereto to perform the steps of:
   a) sending a first directed packet from a first NIC to a second NIC and sending said first directed packet from said first NIC to a client computer system communicatively coupled to said server computer system in a network;
   b) sending a second directed packet from said second NIC to said first NIC;
   c) monitoring said second NIC to determine whether said first directed packet is received by said second NIC;
   d) monitoring said first NIC to determine whether said second directed packet is received by said first NIC and monitoring said first NIC to determine whether a response to said first directed packet is received from said client computer system; and
   e) determining whether said first NIC is functioning using results from said steps c) and d).

18. The computer-usable medium of claim 17 wherein said computer-readable program code embodied therein causes a server computer system to perform the step of:
   providing an indication to said server computer system when said second directed packet is not received by said first NIC.

19. The computer-usable medium of claim 18 wherein said indication is a cable disconnect message.

20. The computer-usable medium of claim 17 wherein said computer-readable program code embodied therein causes a server computer system to perform the steps of:
   sending said first directed packet from said first NIC to a first plurality of NICs;
   sending a directed packet from each of a second plurality of NICs to said first NIC;
   monitoring said first plurality of NICs to determine whether said first directed packet is received by said first plurality of NICs; and
   monitoring said first NIC to determine whether each directed packet sent by said second plurality of NICs is received by said first NIC.

21. The computer-usable medium of claim 20 wherein said computer-readable program code embodied therein causes a server computer system to perform the step of:
   f) automatically substituting one of said plurality of NICs for said first NIC when said first NIC is determined to be non-functioning.

22. The computer-usable medium of claim 21 wherein said computer-readable program code embodied therein causes a server computer system to perform the steps of:
   g) sending a data packet from said server computer system to a client computer system communicatively coupled to said server computer system in a network, wherein said data packet contains a media access control (MAC) address for said one of said plurality of NICs; and
   h) replacing a MAC address for said first NIC with said MAC address for said one of said plurality of NICs in a memory cache in said client computer system.

23. The computer-usable medium of claim 17 wherein said computer-readable program code embodied therein causes a server computer system to perform the step of:
   providing an indication to said server system when said first directed packet is not received by said second NIC.

24. The computer-usable medium of claim 23 wherein said indication is a cable disconnect message.

* * * * *